United States Patent
Wandres et al.

(10) Patent No.: US 11,542,906 B2
(45) Date of Patent: Jan. 3, 2023

(54) STARTER SYSTEM FOR AN INTERNAL COMBUSTION ENGINE IN A VEHICLE

(71) Applicant: Eberspächer Controls Landau GmbH & Co. KG, Landau (DE)

(72) Inventors: Steffen Wandres, Kandel (DE); Mark-Arno Weimann, Mackenbach (DE)

(73) Assignee: EBERSPÄCHER CONTROLS LANDAU GMBH & CO. KG, Landau (DE)

( * ) Notice: Subject to any disclaimer, the term of this patent is extended or adjusted under 35 U.S.C. 154(b) by 0 days.

(21) Appl. No.: 17/572,295

(22) Filed: Jan. 10, 2022

(65) Prior Publication Data
US 2022/0220929 A1 Jul. 14, 2022

(30) Foreign Application Priority Data
Jan. 14, 2021 (DE) .................... 10 2021 100 609.0

(51) Int. Cl.
*F02N 11/00* (2006.01)
*F02N 11/08* (2006.01)

(52) U.S. Cl.
CPC ........ *F02N 11/0862* (2013.01); *F02N 11/087* (2013.01); *F02N 2011/0881* (2013.01)

(58) Field of Classification Search
CPC ............. F02N 11/0862; F02N 11/087; F02N 2011/0811; F02N 2011/0896
See application file for complete search history.

(56) References Cited

U.S. PATENT DOCUMENTS

| | | | |
|---|---|---|---|
| 6,420,793 B1* | 7/2002 | Gale | H02P 9/08 290/34 |
| 10,946,751 B2* | 3/2021 | Uchimura | B60L 50/61 |
| 11,131,285 B2* | 9/2021 | Gibson | F02N 11/0866 |
| 2007/0206394 A1* | 9/2007 | Inagawa | H02M 3/155 363/15 |
| 2014/0306521 A1 | 10/2014 | Eschenhagen | |
| 2019/0219020 A1* | 7/2019 | Liu | F02N 11/0859 |
| 2019/0356239 A1* | 11/2019 | Okudera | H02M 7/48 |
| 2020/0072178 A1* | 3/2020 | Berkson | B60W 10/26 |
| 2020/0153311 A1* | 5/2020 | Gottfried | F02N 5/04 |
| 2020/0298820 A1* | 9/2020 | Shokaku | B60K 6/485 |
| 2020/0400089 A1* | 12/2020 | Seong | H02J 7/1423 |
| 2021/0172415 A1* | 6/2021 | Gibson | F02N 11/04 |
| 2021/0262428 A1* | 8/2021 | Gibson | F02N 11/04 |

FOREIGN PATENT DOCUMENTS

DE 102012222061 A1 6/2014
GB 2 373 648 A 9/2002

* cited by examiner

*Primary Examiner* — Phutthiwat Wongwian
*Assistant Examiner* — Sherman D Manley
(74) *Attorney, Agent, or Firm* — McGlew and Tuttle, P.C.

(57) ABSTRACT

A starter system for an internal combustion engine in a vehicle includes a starter (12), a voltage source (14) for supplying the starter (12) with electrical energy in a start operating state and a down converter (22). The down converter (22) provides a start operating voltage for the starter (12) in the start operating state by down-converting a supply voltage provided by the voltage source (14).

7 Claims, 1 Drawing Sheet

STARTER SYSTEM FOR AN INTERNAL COMBUSTION ENGINE IN A VEHICLE

CROSS REFERENCE TO RELATED APPLICATIONS

This application claims the benefit of priority under 35 U.S.C. § 119 of German Application 10 2021 100 609.0, filed Jan. 14, 2021, the entire contents of which are incorporated herein by reference.

TECHNICAL FIELD

The present invention pertains to a starter system for an internal combustion engine in a vehicle.

TECHNICAL BACKGROUND

Internal combustion engines provided in vehicles are generally started by starters that operate with an electric motor. In this case, in the start state, i.e., for starting an internal combustion engine, a supply voltage of, for example, 12 V, which is provided by a voltage source, for example, by a lead battery or a lithium ion battery, is applied to a first starter terminal of the starter via a starter switch to be closed or to be kept closed in the start operating state. A second starter terminal of the starter may be connected to a ground potential of the vehicle, so that a torque is generated, which revs up the internal combustion engine by the electrical voltage being applied to the starter or by the electric current flowing through the starter winding in the starter. Since the starter is inoperative at the beginning of the start process, a very high electric current, for example, of up to 1,000 A, flows through the starter winding of the starter because of mutual induction essentially not yet being present in this state and because of the comparatively low ohmic resistance of the starter winding. Because of the voltage drop occurring essentially entirely in the voltage source in this state, this leads to a very high load of the voltage source and may especially lead to a magnetic oversaturation of the starter as well, with the additional consequence of a risk of a voltage drop in the on-board voltage system and of a comparatively low efficiency in the start operating state.

SUMMARY

An object of the present invention is to provide a starter system for an internal combustion engine, with which an efficient starting operation is achieved with a low load of a voltage source providing a supply voltage for the starter.

This object is accomplished according to the present invention by a starter system for an internal combustion engine in a vehicle, comprising:
 a starter
 a voltage source to supply the starter with electrical energy in a start operating state, and
 a down converter (step-down converter) to provide a start operating voltage for the starter in the start operating state by down-converting (step-down converting) a supply voltage provided by the voltage source.

By using a down converter which is also generally called a buck converter, a start operating voltage, which is reduced compared with the supply voltage of the voltage source and which especially also avoids the occurrence of an excessively high electric current in a start phase of the start operation and thus an excessive load of the voltage source as well as the risk of a voltage drop in an on-board voltage system, can be provided for the starter essentially without energy losses. It is thus possible to use a voltage source having smaller dimensions because of the lower load of the voltage source, without this (voltage source) and also the starter being exposed to an excessive load. Because of the increased operating safety, especially the increased voltage safety for an on-board voltage system, there is thus an ASIL (Automotive Safety Integrity Level) ability, so that a starter system which is configured according to the present invention is also suitable for use in hybrid vehicles.

The down converter may comprise a converter inductance (inductivity) as well as a first switch unit, wherein a first switch terminal of the first switch unit is to be connected to the voltage source and a second switch terminal of the first switch unit is connected to a first starter terminal of the starter, wherein the converter inductance comprises a starter winding of the starter according to an especially advantageous aspect for obtaining an especially simple structure of the down converter.

The down converter may further comprise a second switch unit, wherein a first switch terminal of the second switch unit is connected to the second switch terminal of the first switch unit and to the first starter terminal of the starter, and a second switch terminal of the second switch unit is connected to a second starter terminal of the starter. A circuit is thus obtained, in which the first switch unit and the starter are connected to one another in series and the second switch unit is connected in series to the first switch unit and parallel to the starter or to the converter inductance provided by the starter winding.

Provisions may be made for supplying the starter with electrical energy in the start operating state by the first switch terminal of the first switch unit being connected to a positive pole of the voltage source and by the second switch terminal of the second switch unit and the second starter terminal of the starter being connected to a ground potential.

Taking into consideration the comparatively high electric currents of up to a few 100 A flowing in the start operating state, it is proposed that the first switch unit comprise at least one first metal-oxide-semiconductor field-effect transistor (MOSFET) switch, wherein a drain terminal of the at least one first MOSFET switch provides the first switch terminal of the first switch unit and a source terminal of the at least one first MOSFET switch provides the second switch terminal of the first switch unit, or/and that the second switch unit comprise at least one second MOSFET switch, wherein a drain terminal of the at least one second MOSFET switch provides the first switch terminal of the second switch unit and a source terminal of the at least one second MOSFET switch provides the second switch terminal of the second switch unit.

To be able to provide a start operating voltage that is reduced in relation to the supply voltage of the voltage source by the opening and the closing of the switch units being coordinated with each other, without generating an electrical short-circuit via the switch units as a result, it is proposed that an actuating unit be provided for the selective opening and closing of the first switch unit and of the second switch unit in the start operating state such that the second switch unit is closed essentially only if the first switch unit is open, and the first switch unit is closed essentially only if the second switch unit is open.

For connecting the first switch unit to the voltage source in the start operating state, provisions may be made for the first switch terminal of the first switch unit to be connected to the voltage source via a starter switch, wherein a first switch terminal of the starter switch is connected to the voltage source and a second switch terminal of the starter switch is connected to the first switch terminal of the first switch unit.

In order to make possible a current flow, which leads to the closing of the starter switch because of the electromagnetic force generated thereby, at the beginning of the start process, i.e., if the starter switch is at first still open, it is proposed that a capacitor unit be provided, wherein a first capacitor terminal of the capacitor unit is connected to the first switch terminal of the first switch unit and to the second switch terminal of the starter switch and a second capacitor terminal of the capacitor unit is connected to a second starter terminal of the starter or/and to a ground potential. The provision of such a capacitor unit further increases the electromotive compatibility (EMV) in the starter system configured according to the present invention.

The present invention further pertains to a process for operating a starter system which is configured according to the present invention for starting an internal combustion engine, wherein after a start command is generated, the down converter is operated such that a start operating voltage applied to the starter is lower than a supply voltage provided by the voltage source, or/and that a starter current flowing through a starter winding of the starter does not exceed a predefined start current threshold.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
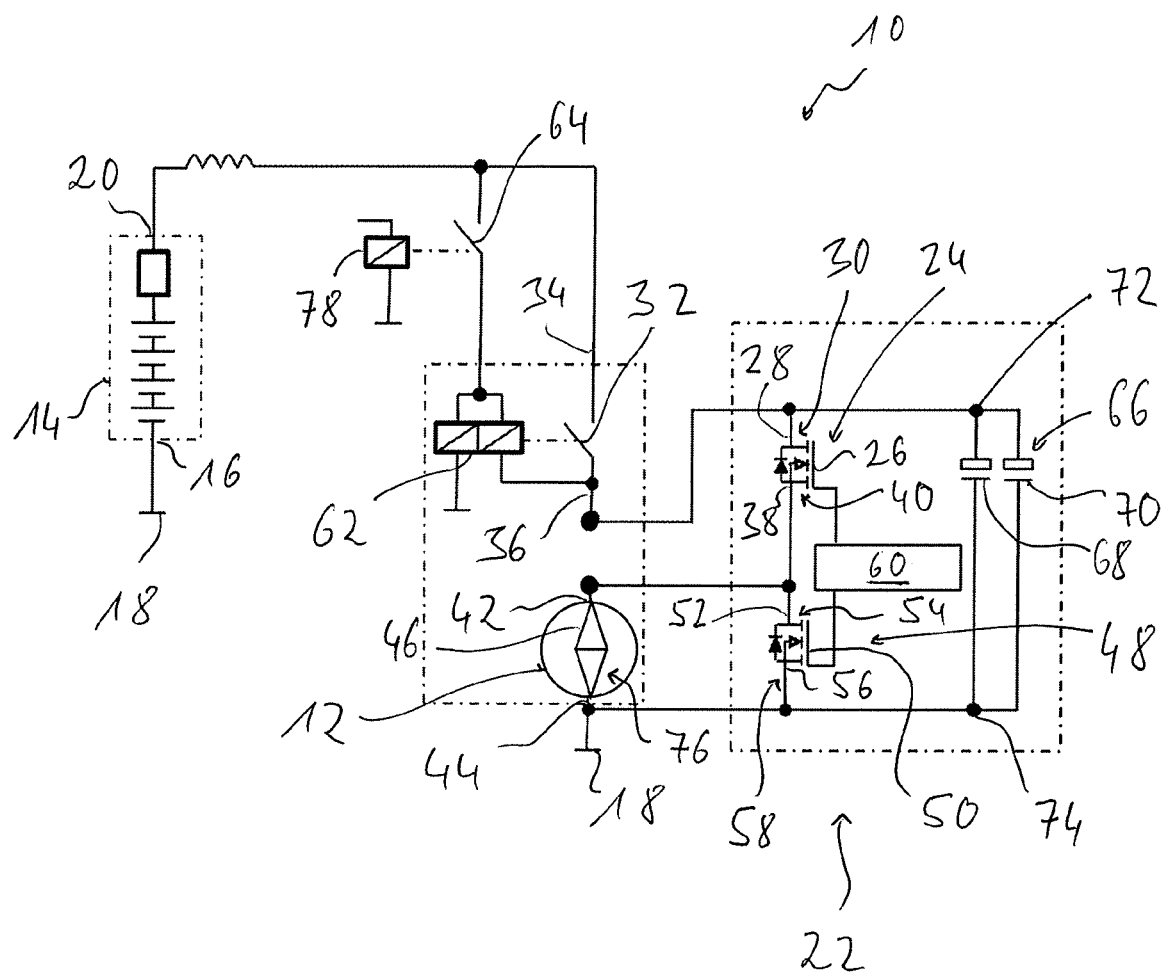
FIG. 1 is a simplified circuit diagram of a starter system for starting an internal combustion engine of a vehicle.

Referring to the drawings, a starter system for an internal combustion engine in a vehicle is generally designated by 10 in FIG. 1. The starter system 10 comprises a starter 12 that operates with an electric motor and that generates a torque in the start operating state, by means of which (torque) an internal combustion engine to be started with the starter system 10 is revved up.

The starter system 10 further comprises a voltage source 14, which is configured, for example, as a lead battery or as a lithium ion battery and which is configured as a d.c. voltage source and can be connected with a negative pole 16 to a ground potential 18 of a vehicle and provides a supply voltage of, for example, 12 V at a positive pole 20.

Based on the supply voltage provided by the voltage source 14, a start voltage is applied to the starter 12 in a start operating state, the voltage level of which is below the supply voltage provided by the voltage source 14. For this purpose, the starter system 10 uses a down converter 22, which is also generally called a buck converter. The down converter 22 comprises a first switch unit 24, which is configured with a first MOSFET switch in the exemplary embodiment shown. A drain terminal 28 of the first MOSFET switch 26 provides a first switch terminal 30 of the first switch unit 24 and is to be connected to the voltage source 14 via a starter switch 32, which is configured as a relay switch. The starter switch 32 has a first switch terminal 34, which is connected to the positive pole 20 of the voltage source 14, and a second switch terminal 36, which is connected to the first switch terminal 30 of the first switch unit 24.

A source terminal 38 of the first MOSFET switch 26 of the first switch unit provides a second switch terminal 40 of the first switch unit 24 and is connected to a first starter terminal 42 of the starter 21. A second starter terminal 44 of the starter 12 is connected to the ground potential 18 of the vehicle. In the start operating state, an electric current flows between the first starter terminal 42 and the second starter terminal 44 via a starter winding 46.

The down converter 22 further comprises a second switch unit 48. The second switch unit 48 is also configured with a MOSFET switch 50. A drain terminal 52 of the second MOSFET switch 50 provides a first switch terminal 54 of the second switch unit 48, and a source terminal 56 of the second MOSFET switch 50 provides a second switch terminal 58 of the second switch unit 48. The first switch terminal 54 of the second switch unit 48 is connected to the second switch terminal 40 of the first switch unit 24 and to the first starter terminal 42. The second switch terminal 58 of the second switch unit 48 is connected to the second starter terminal 44 and to the ground potential 18.

An actuating unit 60 is associated with the two switch units 24, 48. As the switch units 24, 48 are each configured with at least one MOSFET switch 26, 50, the actuating unit 60 is configured to apply a gate voltage to the MOSFET switch 26, 50 in order to connect this MOSFET switch in a conductive manner, i.e., to close same and thus to make possible a current flow via this MOSFET switch.

It should be pointed out that taking into consideration the comparatively large currents flowing in the start operating state, the switch units 24, 48 may have a plurality of MOSFET switches 36 and 50, which are connected parallel to one another, so that a part of the entire flowing current is conductive via each of the MOSFET switches 26, 50.

A solenoid switch which is generally designated by 62 is associated with the starter switch 32. This solenoid switch generates, by means of a winding provided in it, an electromagnetic force when an electrical voltage is applied to it, which electromagnetic force closes the starter switch 32. The voltage is applied to the solenoid switch 62 by means of a control switch 64, which is closed when a start command is generated and thus applies the supply voltage provided by the voltage source 14 at the positive pole of same to the solenoid switch 62. Consequently, in order to be able to generate the electromagnetic force action necessary for closing the starter switch 32, a current flow via the solenoid switch is necessary when the starter switch 32 is still open. In order to make possible this current flow, a capacitor unit 66 is provided, which in the exemplary embodiment shown comprises two capacitors 68, 70, which are connected parallel to one another. A first capacitor terminal 72 of the capacitor unit 66 is connected to the first switch terminal 30 of the first switch unit 24 and thus to the second switch terminal 36 of the starter switch 32. A second capacitor terminal 74 of the capacitor unit 66 is connected to the second switch terminal 58 of the second switch unit 48, to the second starter terminal 44 of the starter 12 and thus to the ground potential 14. The electric current through a winding of the starter relay 62 needed for closing the starter switch 32 leads to charging the capacitors 68, 70 of the capacitor unit 66. The capacitor unit 66 increases the electromotive compatibility (EMV) in the starter system 10 as well.

In the starter system 10 described above with reference to FIG. 1, the starter winding 46, which is connected in series to the first switch unit 24 and is connected parallel to the second switch unit 48, forms a converter inductance 76 of the down converter 22. The starter 12 is thus integrated with its starter winding 46 into the down converter 22, which leads to a configuration that can be embodied in a simple manner.

The operation of the starter system 10 for starting an internal combustion engine will be described below.

The starting process begins when, by generating a start command, the control switch 64 is brought into its closed state by a control relay 78 associated with this control switch and thus the starter switch 32 is also closed by means of the solenoid switch 62 by applying the supply voltage of the voltage source 14. The supply voltage provided by the voltage source 14 is applied in this state to the first switch terminal 30 of the first switch unit 24. For applying a start operating voltage with a voltage level below the supply voltage of the voltage source 14 to the starter 12, the two switch units 24, 28 are alternately closed and opened by corresponding actuation by means of the actuating unit 60 and thus alternately switched into a conductive state or into a blocking state. In this case, when the first MOSFET switch 26 of the first switch unit 24 is in its conductive state, i.e., is closed, the second MOSFET switch 50 of the second switch unit 48 is open, i.e., in its nonconductive state. The closing of the first MOSFET switch 26 leads to the application of the support voltage of the voltage source 14 to the first starter terminal 42 of the starter 12 and accordingly to an increasing current flow through the starter winding 46, which also provides the converter inductance 76. The flow of current through the starter winding 46 is monitored. If this current flow reaches a predefined start current threshold, for example, in the range of 300 A, the first MOSFET switch 26 is opened, so that a further increase of the electric current flowing through the starter winding 46 is prevented. At the same time or after the opening of the first MOSFET switch 26, the second MOSFET switch 50 is closed, so that a then decreasing current flow through the starter winding 46 is maintained via the second MOSFET switch 50. If the electric current flowing through the starter winding 46 then reaches or drops below a lower current threshold, the second MOSFET switch 50 is opened again and the first MOSFET switch 26 is closed, so that by reapplying the supply voltage of the voltage source 14 to the starter winding 46, the electric current flowing through this starter winding increases again.

Due to the alternate opening and closing of the MOSFET switches 26, 50 of the two switch units 24, 48, it thus becomes possible to control the electric current flowing through the starter winding 46 such that this electric current is in a range suitable for the starting process to be carried out. Thus, due to the alternate opening and closing of the two switch units 24, 48, an average voltage being applied to the first starter terminal 42 is set, which average voltage is below the supply voltage provided by the voltage source 14. Thus, a dynamic adaptation of the load resistance of the starter 12 to the inner resistance of the voltage source 14 is achieved and thus a higher efficiency of the starter system 10 is guaranteed. At the same time, an excessively high current flow through the starter winding 46 is avoided, so that an overload of the voltage source 14 due to the voltage drop occurring because of the inner resistance of same is also prevented. This contributes to a significant increase of the service life of the voltage source 14 and especially of the starter 12 as well.

Since the load of the voltage source 14 occurring in the start operation can be kept comparatively low with the starter system 10 configured according to the present invention, it is possible for the voltage source 14 to have small dimensions, which is especially advantageous because of the lower weight. Further, the control of the electric current flowing through the starter winding 46 carried out in the start operating state avoids a voltage drop in an on-board voltage system, especially in a start-stop operation of an internal combustion engine. The thus provided increased voltage safety leads to an ASIL ability of the starter system 10, so that this starter system may also be used, for example, in hybrid vehicles, in order to be able to carry out a transition from an electric motor operation to a combustion operation.

In the starter system 10 configured according to the present invention, the down converter 22 may be installed very close to the starter 12 or close to the solenoid switch 62, which contributes to a high electromotive compatibility. Since the down converter 22 is connected to the second switch terminal 36 of the starter switch 32 and thus after the solenoid switch 62, an expensive reverse battery protection may dispensed with, and an increased safety against a short-circuit is achieved, since, in addition to the two switch units 24, 48, the starter switch 32 or the solenoid switch 62 or the starter switch 32 forms an additional disconnection path. Moreover, since the down converter is connected after the solenoid switch 62 or after the starter switch 32, the main current coil or main winding of the starter relay 62 remains neutral in the starting operation.

It should be further pointed out that the gradual increase in the speed of an internal combustion engine can, of course, be adapted during the start operation in the above-described configuration of the starter system. For example, the current control or the high voltage current threshold can thus be changed such that with increasing speed of the internal combustion engine and thus also with increasing speed of the starter, it is guaranteed that a torque suitable for the further acceleration of the internal combustion engine is provided at any time by the starter 12. In particular, because of the mutual induction in the starter winding 46 also increased with increasing speed of the starter 12, the average voltage being applied to the first starter terminal 42 may increase in order to guarantee a suitable flow of current through the starter winding 46, without there being a risk of an overload of the voltage source 14 as a result.

While specific embodiments of the invention have been shown and described in detail to illustrate the application of the principles of the invention, it will be understood that the invention may be embodied otherwise without departing from such principles.

What is claimed is:

1. A starter system for an internal combustion engine in a vehicle, the starter system comprising:
   a starter;
   a voltage source to supply the starter with electrical energy in a start operating state;
   a starter switch;
   a capacitor unit; and
   a down converter configured to provide a start operating voltage for the starter in the start operating state by down-converting a supply voltage provided by the voltage source, wherein:
   the down converter comprises a converter inductance as well as a first switch unit;

a first switch terminal of the first switch unit is configured to be connected to the voltage source;
a second switch terminal of the first switch unit is connected to a first starter terminal of the starter;
the converter inductance comprises a starter winding of the starter;
a first switch terminal of the starter switch is connected to the voltage source and a second switch terminal of the starter switch is connected to the first switch terminal of the first switch unit;
the first switch terminal of the first switch unit is configured to be connected to the voltage source via the starter switch; and
a first capacitor terminal of the capacitor unit is connected to the first switch terminal of the first switch unit and to the second switch terminal of the starter switch; and
a second capacitor terminal of the capacitor unit is connected to a second starter terminal of the starter or a second capacitor terminal of the capacitor unit is connected to ground potential or a second capacitor terminal of the capacitor unit is connected to a second starter terminal of the starter and is connected to ground potential.

2. The starter system in accordance with claim 1, wherein: the down converter comprises a second switch unit;
a first switch terminal of the second switch unit is connected to the second switch terminal of the first switch unit and to the first starter terminal of the starter; and
a second switch terminal of the second switch unit is connected to a second starter terminal of the starter.

3. The starter system in accordance with claim 2, wherein: the first switch terminal of the first switch unit is configured to be connected to a positive pole of the voltage source; and
the second switch terminal of the second switch unit and the second starter terminal of the starter are connected to a ground potential.

4. The starter system in accordance with claim 2, wherein: the first switch unit comprises at least one first metal-oxide-semiconductor field-effect transistor (MOSFET) switch, a drain terminal of the at least one first MOSFET switch provides the first switch terminal of the first switch unit, and a source terminal of the at least one first MOSFET switch provides the second switch terminal of the first switch unit; or
the second switch unit comprises at least one second MOSFET switch, a drain terminal of the at least one second MOSFET switch provides the first switch terminal of the second switch unit, and a source terminal of the at least one second MOSFET switch provides the second switch terminal of the second switch unit; or
the first switch unit comprises at least one first metal-oxide-semiconductor field-effect transistor (MOSFET) switch, a drain terminal of the at least one first MOSFET switch provides the first switch terminal of the first switch unit, and a source terminal of the at least one first MOSFET switch provides the second switch terminal of the first switch unit and the second switch unit comprises at least one second MOSFET switch, a drain terminal of the at least one second MOSFET switch provides the first switch terminal of the second switch unit, and a source terminal of the at least one second MOSFET switch provides the second switch terminal of the second switch unit.

5. The starter system in accordance with claim 2, further comprising an actuating unit configured to selectively open and close the first switch unit and of the second switch unit in the start operating state such that the second switch unit is closed essentially only if the first switch unit is open, and the first switch unit is closed essentially only if the second switch unit is open.

6. A process for operating a starter system for starting an internal combustion engine in a vehicle, the starter system comprising a starter, a voltage source to supply the starter with electrical energy in a start operating state and a down converter configured to provide a start operating voltage for the starter in the start operating state by down-converting a supply voltage provided by the voltage source, the down converter comprising a converter inductance as well as a first switch unit, a first switch terminal of the first switch unit being configured to be connected to the voltage source, a second switch terminal of the first switch unit being connected to a first starter terminal of the starter, the converter inductance comprising a starter winding of the starter, the starter system further comprising a starter switch, a first switch terminal of the starter switch being connected to the voltage source and a second switch terminal of the starter switch being connected to the first switch terminal of the first switch unit, the first switch terminal of the first switch unit being configured to be connected to the voltage source via the starter switch, the starter system further comprising a capacitor unit, a first capacitor terminal of the capacitor unit being connected to the first switch terminal of the first switch unit and to the second switch terminal of the starter switch, a second capacitor terminal of the capacitor unit being connected to a second starter terminal of the starter or a second capacitor terminal of the capacitor unit being connected to ground potential or a second capacitor terminal of the capacitor unit being connected to a second starter terminal of the starter and being connected to ground potential, the process comprising the steps of:
generating a start command; and
subsequent to generating the start command, operating the down converter comprising:
applying a start operating voltage to the starter that is lower than a supply voltage provided by the voltage source; or
limiting a starter current flowing through a starter winding of the starter such that the starter current does not exceed a predefined start current threshold; or
applying a start operating voltage to the starter that is lower than a supply voltage provided by the voltage source and limiting a starter current flowing through a starter winding of the starter such that the starter current does not exceed a predefined start current threshold.

7. A process, comprising the steps of:
providing a starter system for starting an internal combustion engine in a vehicle, the starter system comprising a starter, a voltage source to supply the starter with electrical energy in a start operating state and a down converter configured to provide a start operating voltage for the starter in the start operating state by down-converting a supply voltage provided by the voltage source, the starter comprising a first starter terminal and a second starter terminal, the down converter comprising a converter inductance and a first switch unit, the first switch unit comprising a first switch terminal and a second switch terminal, the first switch terminal of the first switch unit being configured to be connected to the voltage source, the second switch terminal of the first switch unit being connected to the first starter terminal of the starter, the converter inductance comprising a starter winding of the starter, the starter system further comprising a starter switch, the starter switch comprising a first switch terminal and a second switch terminal, the first switch terminal of the starter switch being connected to the voltage source and the second switch terminal of the starter switch being connected to the first switch terminal of the first switch unit, the first switch terminal of the first switch unit being configured to be connected to the voltage source via the starter switch, the starter system further comprising a capacitor unit, the capacitor unit comprising a first capacitor terminal and a second capacitor terminal, the first capacitor terminal of the capacitor unit being connected to the first switch terminal of the first switch unit and to the second switch terminal of the starter switch, the second capacitor terminal of the capacitor unit being connected to the second starter terminal of the starter or the second capacitor terminal of the capacitor unit being connected to ground potential or the second capacitor terminal of the capacitor unit being connected to the second starter terminal of the starter and being connected to ground potential;

generating a start command; and subsequent to generating the start command, operating the down converter comprising:

applying a start operating voltage to the starter that is lower than a supply voltage provided by the voltage source; or limiting a starter current flowing through a starter winding of the starter such that the starter current does not exceed a predefined start current threshold; or applying a start operating voltage to the starter that is lower than a supply voltage provided by the voltage source and limiting a starter current flowing through a starter winding of the starter such that the starter current does not exceed a predefined start current threshold.

* * * * *